United States Patent
Leslie (10) Patent No.: US 10,363,864 B2
(45) Date of Patent: Jul. 30, 2019

(54) DIRECTION INDICATOR FOR PUSHABLE TRANSPORT OBJECTS

(71) Applicant: Sherri Leslie, Kemper, TX (US)

(72) Inventor: Sherri Leslie, Kemper, TX (US)

( * ) Notice: Subject to any disclaimer, the term of this patent is extended or adjusted under 35 U.S.C. 154(b) by 0 days.

(21) Appl. No.: 16/167,579

(22) Filed: Oct. 23, 2018

(65) Prior Publication Data

US 2019/0054854 A1 Feb. 21, 2019

Related U.S. Application Data

(62) Division of application No. 15/880,636, filed on Jan. 26, 2018.

(60) Provisional application No. 62/600,395, filed on Feb. 21, 2017, provisional application No. 62/601,208, filed on Mar. 15, 2017.

(51) Int. Cl.
| | |
|---|---|
| *B60Q 1/34* | (2006.01) |
| *B60Q 5/00* | (2006.01) |
| *B62B 3/14* | (2006.01) |
| *B62B 5/06* | (2006.01) |
| *B60Q 1/26* | (2006.01) |
| B62J 6/00 | (2006.01) |
| B62J 3/00 | (2006.01) |
| B62J 6/16 | (2006.01) |

(52) U.S. Cl.
CPC ........... *B60Q 1/343* (2013.01); *B60Q 1/2615* (2013.01); *B60Q 5/001* (2013.01); *B62B 3/14* (2013.01); *B62B 5/06* (2013.01); *B60Q 2900/30* (2013.01); *B62J 3/00* (2013.01); *B62J 6/003* (2013.01); *B62J 6/005* (2013.01); *B62J 6/16* (2013.01); *B62J 2006/008* (2013.01)

(58) Field of Classification Search
CPC .................................... B62B 1/00; B60Q 1/00
See application file for complete search history.

(56) References Cited

U.S. PATENT DOCUMENTS

| | | | |
|---|---|---|---|
| 5,933,076 A | 8/1999 | Babb | |
| 6,690,266 B1 | 2/2004 | Jack et al. | |
| 2006/0249320 A1* | 11/2006 | Carter | A47F 10/04 180/65.51 |
| 2010/0117811 A1 | 5/2010 | Liu | |
| 2012/0300439 A1* | 11/2012 | Davis Hatfield | B62B 9/005 362/183 |
| 2015/0291240 A1* | 10/2015 | Yang | B62J 6/005 340/432 |

(Continued)

*Primary Examiner* — Shirley Lu
(74) *Attorney, Agent, or Firm* — Hogan Lovells US LLP (57) ABSTRACT

Various embodiments provide a signaling system for a pushable transport object. The signaling system includes a signaling device and a control device. The signaling device includes at least one indicator light controllable to display a left signal and a right signal, and a first mounting component for mounting the signaling device to a cart. The control device is communicative with the signaling device to control the at least one indicator light. The control device includes a user interface for receiving a user input, in which the user interface includes a left input component for controlling the at least one indicator light to display the left signal and a right input component for controlling the at least one indicator light to display the right signal. The control device further includes a second mounting component for mounting the control device to a handle of the cart.

8 Claims, 6 Drawing Sheets

(56) References Cited

U.S. PATENT DOCUMENTS

2017/0072840 A1\* 3/2017 MossadeghPour .. A42B 3/0453
2018/0236932 A1 8/2018 Leslie \* cited by examiner

DIRECTION INDICATOR FOR PUSHABLE TRANSPORT OBJECTS

CROSS-REFERENCES TO RELATED APPLICATIONS

This application is a divisional application of co-pending U.S. patent application Ser. No. 15/880,636, titled "Direction Indicator for Pushable Transport Objects," filed Jan. 26, 2018, which claims priority to Provisional Patent Application No. 62/600,395, titled "Attachable, Portable, Shopping Cart Directional Signals and Sounds With Wireless Remote Control," filed Feb. 21, 2017; and Provisional Patent Application No. 62/601,208, titled "Attachable, Portable, Shopping Cart Directional Signals With or Without Sound," filed Mar. 15, 2017, of which the full disclosures of these applications are incorporated herein by reference for all purposes.

BACKGROUND

Shopping carts are commonly used in brick and mortar stores for shoppers to be able to collect the items they would like to purchase as they peruse the store. Shopping carts may range in size, but are typically quite large and take up significant space in the aisles of a store. Thus, when there are many shoppers in a store each pushing a shopping cart of their own, the space can become crowded. Particularly, stores are generally designed for multi-directional traffic flow without specific paths or lanes, and shoppers may travel, stop, or turn in random patterns and directions based on the items they are looking for and anything that catches their eye. Additionally, shoppers may be on their cell phones, looking at a product, having conversations, or otherwise distracted and lacking awareness of their surroundings or fellow shoppers. Thus, situations arise in which shoppers' shopping carts bump into each other, block aisles or products, or otherwise cause traffic issues.

BRIEF DESCRIPTION OF THE DRAWINGS

Various embodiments in accordance with the present disclosure will be described with reference to the drawings, in which.

SUMMARY

Various embodiments of the present disclosure provide a signaling system for a pushable transport object. The signaling system includes a signaling device and a control device. The signaling device includes at least one indicator light controllable to display a left signal and a right signal, and a mounting component for mounting the signaling device to a cart. The control device is communicative with the signaling device to control the at least one indicator light. The control device includes a user interface for receiving a user input, in which the user interface includes a left input component for controlling the at least one indicator light to display the left signal and a right input component for controlling the at least one indicator light to display the right signal. The control device further also includes a mounting component for mounting the control device to a handle of the cart.

Various embodiments of the present disclosure provide a shopping cart with directional signaling. The shopping cart includes a basket comprising a front side and a back side, one or more wheels positioned below the basket, and a handle coupled to the back side of the basket by which the cart can be pushed. The shopping cart further includes a signaling system coupled to the front side of the basket and a control system coupled to the handle. The signaling system comprises at least one indicator light controllable to display a left signal and a right signal. The control system is communicative with the signaling system to control the at least one indicator light. The control system comprises a user interface for receiving a user input, in which the user interface includes a left input component for controlling the at least one indicator light to display the left signal and a right input component for controlling the at least one indicator light to display the right signal.

Various embodiments of the present disclosure provide a pushable transport object with directional signaling. The pushable transport object a transport object, which includes a carriage, a front portion, a back portion, and a handle coupled to the back portion by which the transport object can be pushed. The pushable transport object further includes a signaling system coupled to the front portion and a control system coupled to the handle. The signaling system includes at least one indicator light controllable to display a left signal and a right signal. The control system is communicative with the signaling system to control the at least one indicator light. The control system includes a user interface for receiving a user input. The user interface includes a left input component for controlling the at least one indicator light to display the left signal and a right input component for controlling the at least one indicator light to display the right signal.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for pushable transport objects. In particular, various embodiments provide direction indication systems for pushable transport objects, including transport vehicles.

Many people are regularly in situations of pushing an object such as a shopping cart, stroller, wheelchair, or other transport objects against oncoming pedestrian traffic where many oncomers are also pushing a transport object. In many of these situations, the two-way traffic flow shares the same general space, as there are no markers or lane designation. For example, the space may be the same aisle at a shopping store, the same path on a jogging/biking trail, on the same sidewalk, in a parking lot, among others. Thus, it may be difficult to know what direction the oncomer intends to go. Presently, the lack of an effective means of communication in such situations may cause confusion, frustration, and accidents. In addition to pushable transport means, embodiments of the present disclosure can be used on other transport vehicles such as electric shopping carts, electric wheelchairs, bicycles, or other vehicles for transporting people or things. Such vehicles may be used in places such as grocery stores, jogging/bike trails, parks, event spaces, convention centers, sidewalks, parking lots, among others. Another object of the present invention is to provide a signaling system that can be attached and detached from such transport vehicles, in which the signaling system is portable, compact, easily attachable and detachable, and cost effective.

Figure 1:
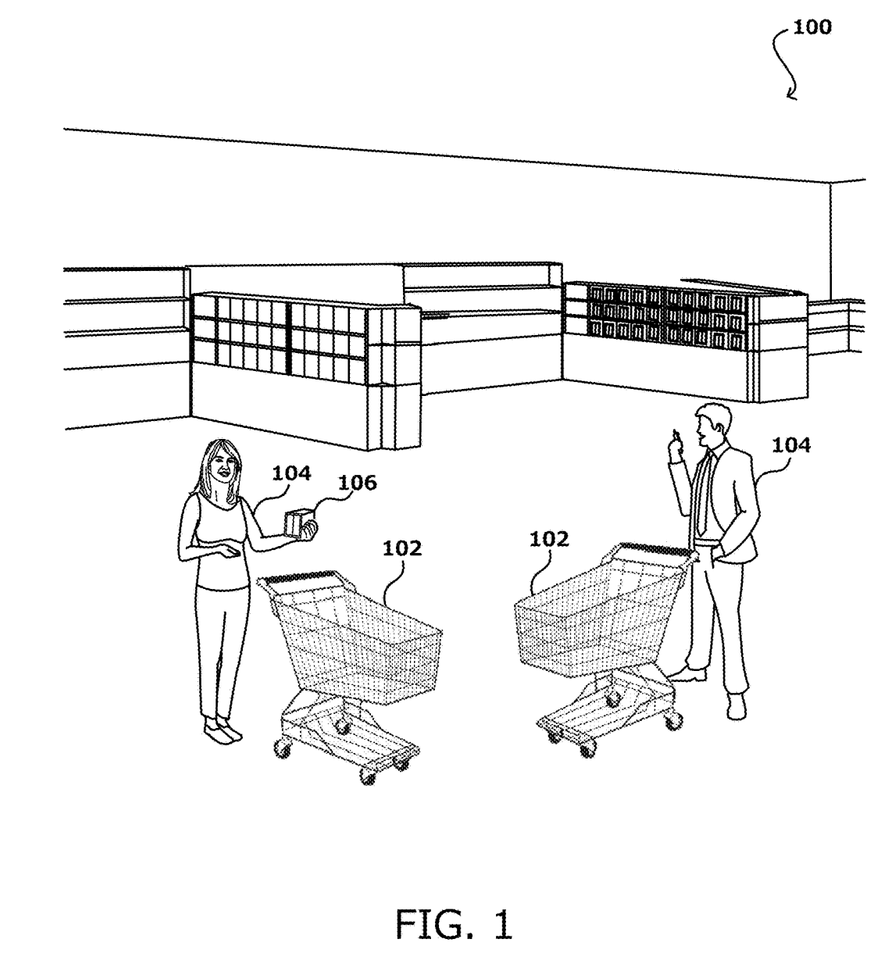
FIG. 1 illustrates an example environment in which various embodiments may be used.

FIG. 1 illustrates an example environment in which various embodiments may be used. Shopping carts 102 are commonly used in brick and mortar stores for shoppers 104 to be able to collect the items 106 they would like to purchase as they peruse the store. Shopping carts 102 may range in size, but are typically quite large and take up significant space in the aisles of a store. Thus, when there are many shoppers 104 in a store each pushing a shopping cart 102 of their own, the space can become crowded. Particularly, stores are generally designed without specific paths or lanes, and shoppers may travel, stop, or turn in random patterns and directions based on the items they are looking for and anything that catches their eye. Thus, situations arise in which shoppers' shopping carts 102 may bump into each other, block each other, or otherwise cause traffic issues. Furthermore, many shoppers are in a hurry, and such traffic issues may cause delays, stress, and frustration for shoppers. Thus, various embodiments of the present disclosure provide a shopping cart directional signaling system, which allows shoppers to easily communicate with one another regarding the intended direction of travel of themselves and their cart. Additionally, as further described below, the systems and techniques described herein are applicable to other types of pushable transport vehicles in addition to shopping carts, including strollers, wheelchairs, platform carts, among others.

Figure 2:
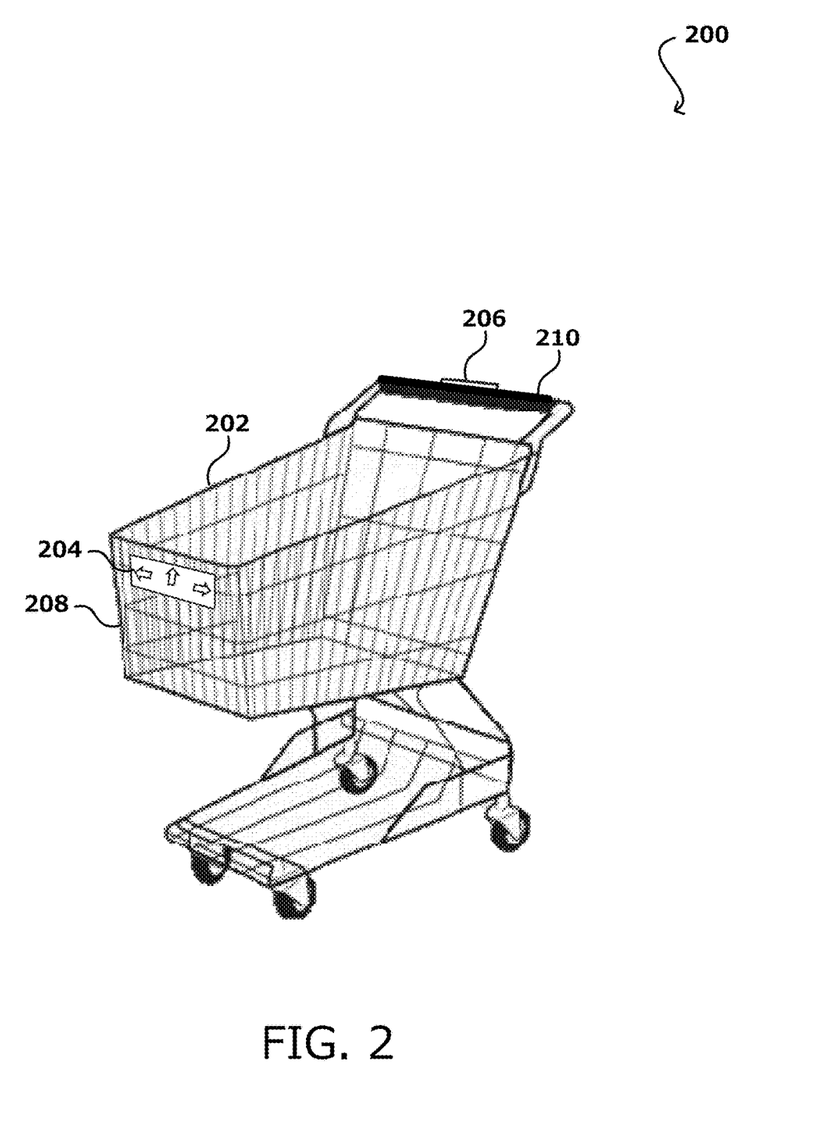
FIG. 2 illustrates an example of a signaling system attached to a shopping cart, in accordance with various embodiments of the present disclosure.

FIG. 2 illustrates an example of a signaling system 200 for pushable transport objects, in accordance with various embodiments. Specifically, FIG. 2 illustrates a shopping cart 202, as an example transport vehicle, with a directional signaling system coupled thereto. The directional signaling system 200 may include a signaling device 204 and a control device 206. The signaling device 204 serves as a direction indicator and may be mounted on a front side 208 of the shopping cart. The control device 206 serves as a remote control for controlling the signaling device 204. The control device 206 may be mounted onto a handle 210 of the shopping cart 202, where a user can operate it to control the signaling device 204 to display the desired directional signal. Thus, the signaling device 204 and the control device 206 each include a mounting component by which they are mountable to the shopping cart 202. In some embodiments, the mounting components may be removable mounting components such that the signaling device 204 and the control device 206 may be attached to the shopping cart 202 for a shopping session and removed from the shopping cart 202 after the shopping session, and then reattached to a shopping cart, or other type of transport object, when it is needed. The mounting components may include release mechanisms that allow the devices to be removed from the pushable vehicle. Thus, the directional signaling system 200 can use used, stored, and reused many times in multiple situations and with multiple different pushable vehicles. In some embodiment, the mounting components may include straps, magnets, clips, adhesives, among other attachment mechanisms. In some embodiments, the mounting components may be provide permanent attachment means to retrofit a shopping cart, such as screws, permanent adhesives, and the like.

Figure 3A:
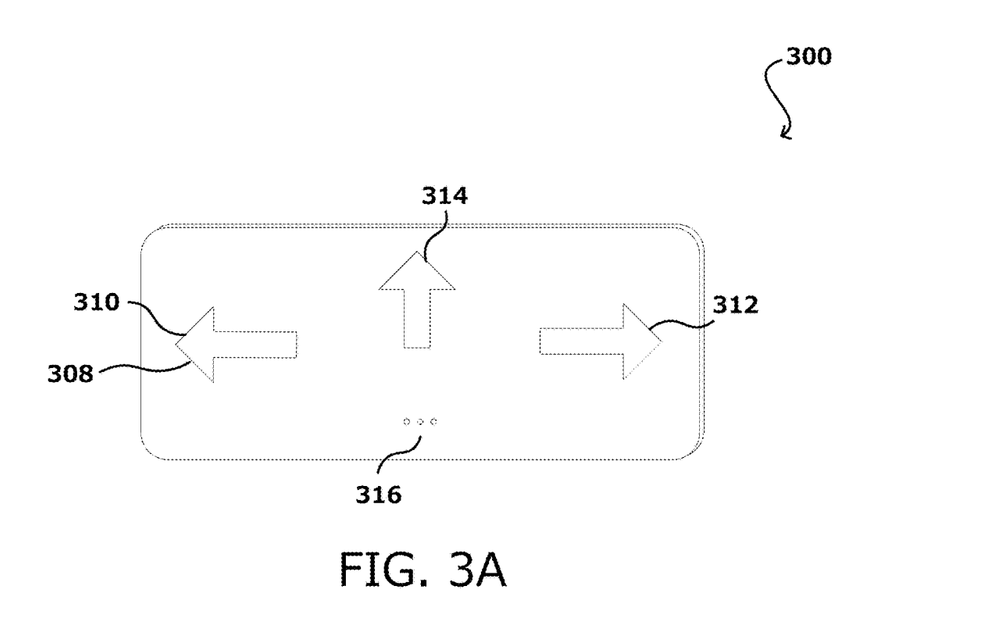
FIG. 3A illustrates a detailed view of the signaling device of the signaling system of FIG. 2, in accordance with various embodiments of the present disclosure.
Figure 3B:
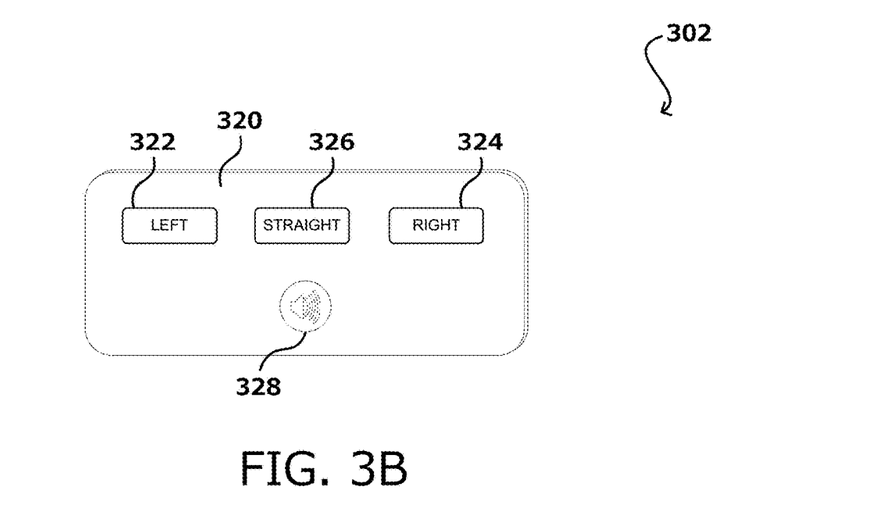
FIG. 3B illustrates a detailed view of a control device of the signaling system of FIG. 2, in accordance with various embodiments of the present disclosure.

FIG. 3A illustrates in further detail an example embodiment of a signaling device 300, such as the signaling device 204 attached to the shopping cart in FIG. 2. FIG. 3B illustrates in further detail an example embodiment of a control device 302, such as the control device 206 attached to the shopping cart in FIG. 2. Referring first to FIG. 3A, the signaling device 300 includes at least one indicator light 308 controllable to display a first directional signal 310 (e.g., left signal) and a second directional signal 312 (e.g., right signal). The first directional signal 310 may be controlled to light up to indicate an intention to turn or move towards the first direction and the second directional signal 312 may be controlled to light up to indicate an intention to turn or move towards the second direction. In some embodiments, the signaling device 300 may include a third direction signal 314 (e.g., straight ahead signal) to indicate the intention to continue straight ahead. In various embodiments, the signals 310, 312, 314 may light up. In some other embodiments, the signals 310, 312, 314 may otherwise be activated to provide visual indication of an intended direction of travel. In various embodiments, the signaling device 300 may further include an audio output device 316 controllable to emit a sound. For Example, the audio output device 316 may output beeping sounds, horn sounds, musical sounds, human language messages, among other types of sounds.

Referring now to FIG. 3B, the control device 302 is communicative with the signaling device to control the at least one indicator light, such as any of the directional signals 310, 212, 314. In some embodiments, the control device 302 may also control the audio output device 316 of the signaling device 300 to emit a sound. In various embodiments, the control device 302 includes a user interface 320 for receiving a user input, in which the user interface 320 includes a first directional input component 322 (e.g., left input) for controlling the at least one indicator light to display the first directional signal 310 (e.g., left signal) and a second directional input component 324 (e.g., right input) for controlling the at least one indicator light 308 to display the second directional signal 312 (e.g., right signal). In some embodiments, the first and second directional input components 322, 324 may include buttons, which when pressed, cause the control device 302 to display the appropriate signal. The control device 302 may further include a third directional input component 326 (e.g., straight input) which controls the signaling device 300 to display the third, or straight ahead signal 312. In some embodiments, the control device 302 further includes a sound input component 328, which controls the audio output device 316 of the signaling device 300 to emit a sound, as described above. Any of the described user input components may be buttons. In some other embodiments, the user input components may be portions of a touch screen or other means of allowing a user to control the signaling device 300.

In various embodiments, the control device 302 may be communicative with the signaling device 300 through wired or wireless communications. Examples of wireless communication can include Bluetooth, radiofrequency communications, among others. In various embodiments, either or both of the signaling device 300 and the control device 302 may include or are coupled to a power source, such as a battery or a solar power source, among other. In some embodiments, either or both of the signaling device 300 and the control device 302 may include a solar panel for generating solar power for powering the either or both of the signaling device 300 and the control device 302. In some embodiments, the control device 302 may be implemented or provided through a smart phone, such as in which the user interface 320 is a display screen of the smartphone and provided through an application (i.e., "app") on the smart phone. Thus the user can control the signaling device 300 via the smart phone. In various embodiments, both the signaling device 300 of FIG. 3A and the control device 302 of FIG. 3B may be portable and attachable/detachable from a shopping cart of other pushable transport vehicle, including strollers, wheelchairs, platform carts, among others.

Figure 4:
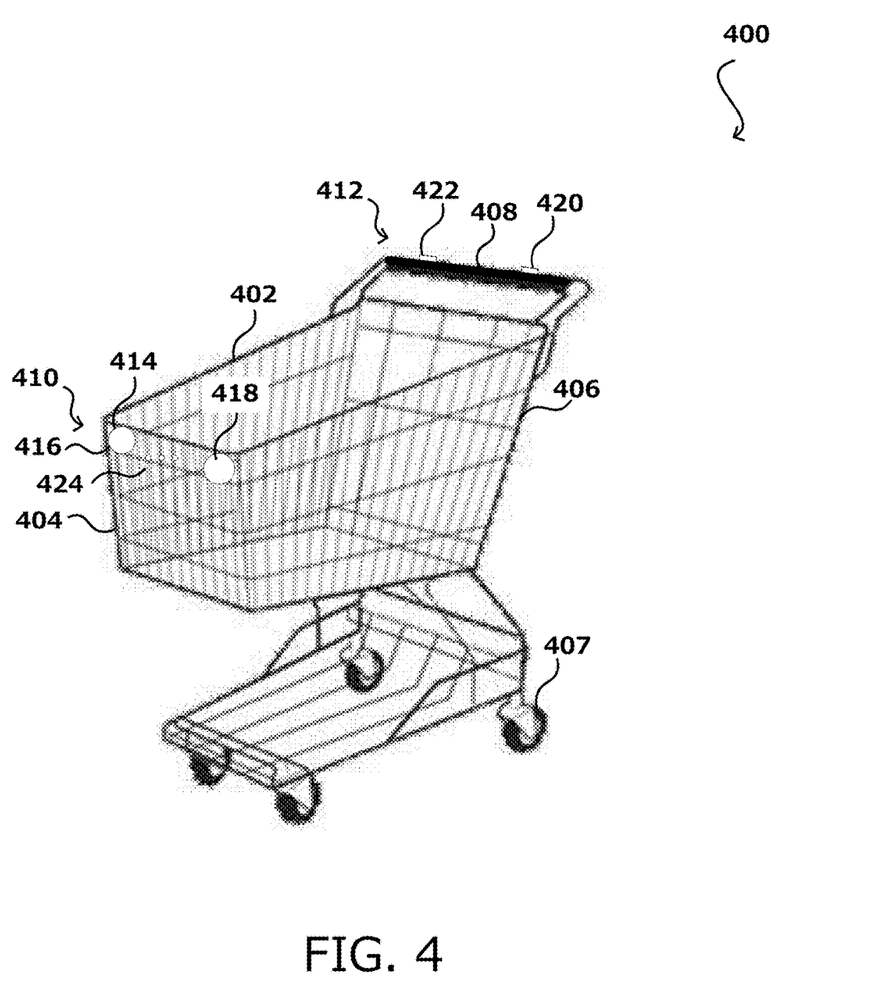
FIG. 4 illustrates an example shopping cart with integrated directional signaling, in accordance with various embodiments of the present disclosure.

FIG. 4 illustrates an example shopping cart 400 with integrated directional signaling, in accordance with various embodiments. The shopping cart 400 includes a basket 402 comprising a front side 404 and a back side 406, one or more wheels 407 positioned below the basket 402, and a handle 408 coupled to the back side 406 of the basket 402 by which the cart 400 can be pushed. The shopping cart 400 further includes a signaling system 410 coupled to the front side 404 of the basket 402 and a control system 412 coupled to the handle 408. In various embodiments, the signaling system 410 comprises at least one indicator light 414 controllable to display a first directional signal 416 and a second directional signal 418. In various embodiments, the first directional signal 416 includes one indicator light and the second directional signal 418 includes a separate indicator light, in which the first and second directional signals 416, 418 are positioned on respective sides of the front of the basket 402. In various other embodiments, the first and second directional signals 416, 418 are positioned on respective sides of one another elsewhere on the shopping cart 400. In some embodiments, the first and second directional signals 416, 418 may be displayed by the same indicator light. For example, the indicator light may include a plurality of LEDs which light up in a first pattern to display the first directional signal 416, such as the shape of a left facing arrow. The same indicator light may also light up in a second pattern to display the second directional signal 418, such as in the shape of a right facing arrow. Operation of the indicator light to display either the first directional signal 416 or the second directional signal 418 may be controlled by the control system 412. In some embodiments, the signaling device 410 may include a third direction signal (e.g., straight ahead signal) to indicate the intention to continue straight ahead.

The control system 412 is communicative with the signaling system 410 to control the at least one indicator light. The control system 412 may comprise a user interface for receiving a user input, including a first directional input component 420 for controlling the at least one indicator light to display the first directional signal and a second directional input component 422 for controlling the at least one indicator light to display the second directional signal. In some embodiments, and as illustrated in FIG. 4, the first and second directional input components 420, 422 may include respective buttons, such as buttons built into the handle of the shopping cart 400. Thus, the user may easily press any of the buttons to indicate a direction of travel while pushing the shopping cart 400. In some embodiments, the control device 206 may further include a third directional input component (e.g., straight input) which controls the signaling device 410 to display the third, or straight ahead signal mentioned above.

In various embodiments, the shopping cart 400 may further include an audio output device 424 for outputting a sound (e.g., beep, horn, message) and a corresponding button or other user input components for activating or otherwise controlling the audio output device to emit the sound. The control system 412 and the signaling system 410 may communicate through wired or wireless communications. For example, circuitry for and connecting the control system 412 and the signaling system 410 may be embedded in various parts of the shopping cart. In various embodiments, either or both of the signaling device 410 and the control device 412 may include or are coupled to a power source, such as a battery or a solar power source, among others.

Figure 5:
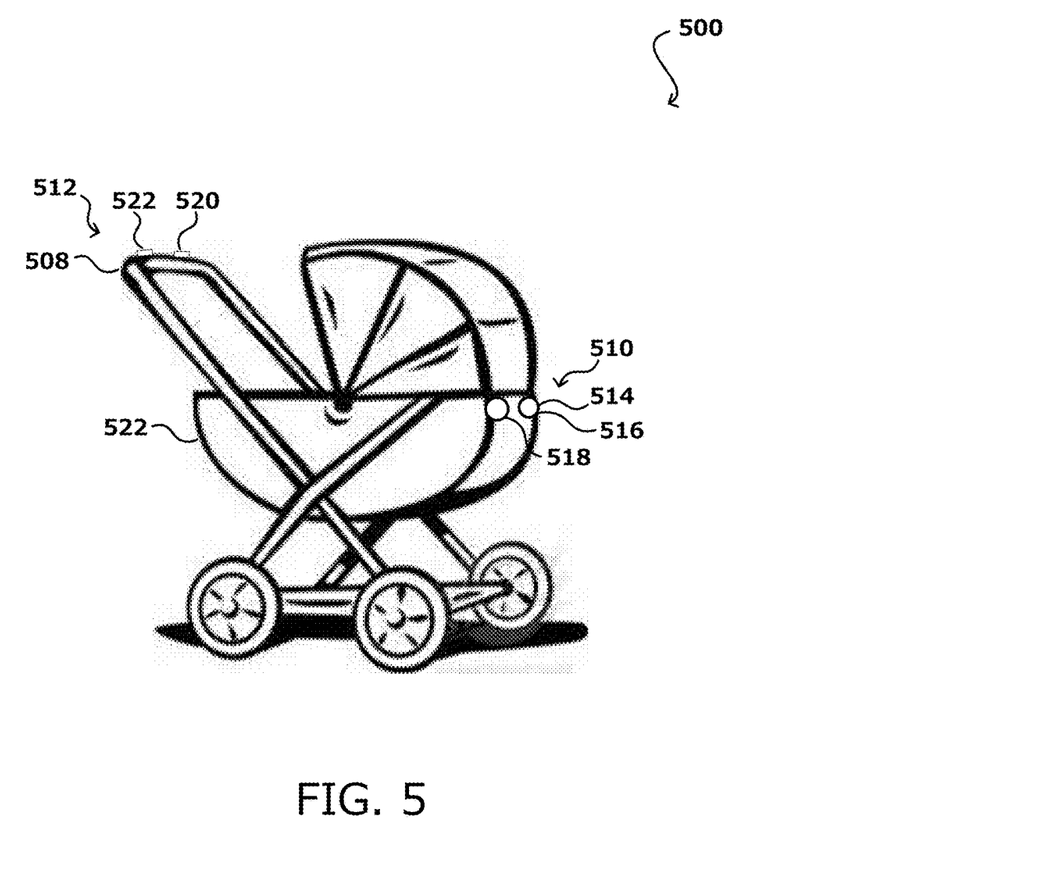
FIG. 5 illustrates an example pushable transport object with directional signaling, in accordance with various embodiments of the present disclosure.

FIG. 5 illustrates a pushable transport object or vehicle 500 with directional signaling, in accordance with various embodiments. Specifically, FIG. 5 illustrates a stroller with directional signaling. The pushable vehicle 500 may include a carriage portion 502 for carrying things for transport and a handle 508 by which the vehicle 500 can be pushed. The pushable vehicle 500 further includes a signaling system 510 coupled to the front portion 504 and a control system 512 coupled to the handle 508. The carriage portion 502 may be any type of apparatus (e.g., platform, basket, seat) for carrying anything thereon, including items, persons, or animals.

In various embodiments, the signaling system 510 comprises at least one indicator light 514 controllable to display a first directional signal 516 and a second directional signal 518. In various embodiments, the first directional signal 516 includes one indicator light and the second directional signal 518 includes a separate indicator light, in which the first and second directional signals 516, 518 are positioned on respective sides of the front of the carriage portion 502. In various other embodiments, the first and second directional signals 516, 518 are positioned on respective sides of one another elsewhere on the vehicle 500. In some embodiments, the first and second directional signals 516, 518 may be displayed by the same indicator light. For example, the indicator light may include a plurality of LEDs which light up in a first pattern to display the first directional signal 516, such as the shape of a left facing arrow. The same indicator light may also light up in a second pattern to display the second directional signal 518, such as in the shape of a right facing arrow. Operation of the indicator light to display either the first directional signal 516 or the second directional signal 518 may be controlled by the control system 512. In some embodiments, the signaling device 510 may include a third direction signal (e.g., straight ahead signal) to indicate the intention to continue straight ahead.

The control system 512 is communicative with the signaling system 510 to control the at least one indicator light. The control system 512 may comprise a user interface for receiving a user input, including a first directional input component 520 for controlling the at least one indicator light to display the first directional signal and a second directional input component 522 for controlling the at least one indicator light to display the second directional signal. In some embodiments, and as illustrated in FIG. 5, the first and second directional input components 520, 522 may include respective buttons, such as buttons built into the handle 508. Thus, the user may easily press any of the buttons to indicate a direction of travel while pushing the vehicle 500. In some embodiments, the control device 512 may further include a third directional input component (e.g., straight input) which controls the signaling device 510 to display the third, or straight ahead signal mentioned above.

In various embodiments, the pushable vehicle 500 may further include an audio output device for outputting a sound (e.g., beep, horn, message) and a corresponding button or other user input components for activating or otherwise controlling the audio output device to emit the sound. The control system 512 and the signaling system 510 may communicate through wired or wireless communications. For example, circuitry for and connecting the control system 512 and the signaling system 510 may be embedded in various parts of the vehicle 500. In various embodiments, either or both of the signaling device 510 and the control device 512 may include or are coupled to a power source, such as a battery or a solar power source, among other. Although the example pushable vehicle illustrated in FIG. 5 is a stroller, in other embodiments, the pushable vehicle may be any type of vehicle that can be pushed by a user, such as to transport things, people, or animals, including a platform cart, a wheelchair, a shopping cart, a luggage cart, luggage, among many others.

Figure 6:
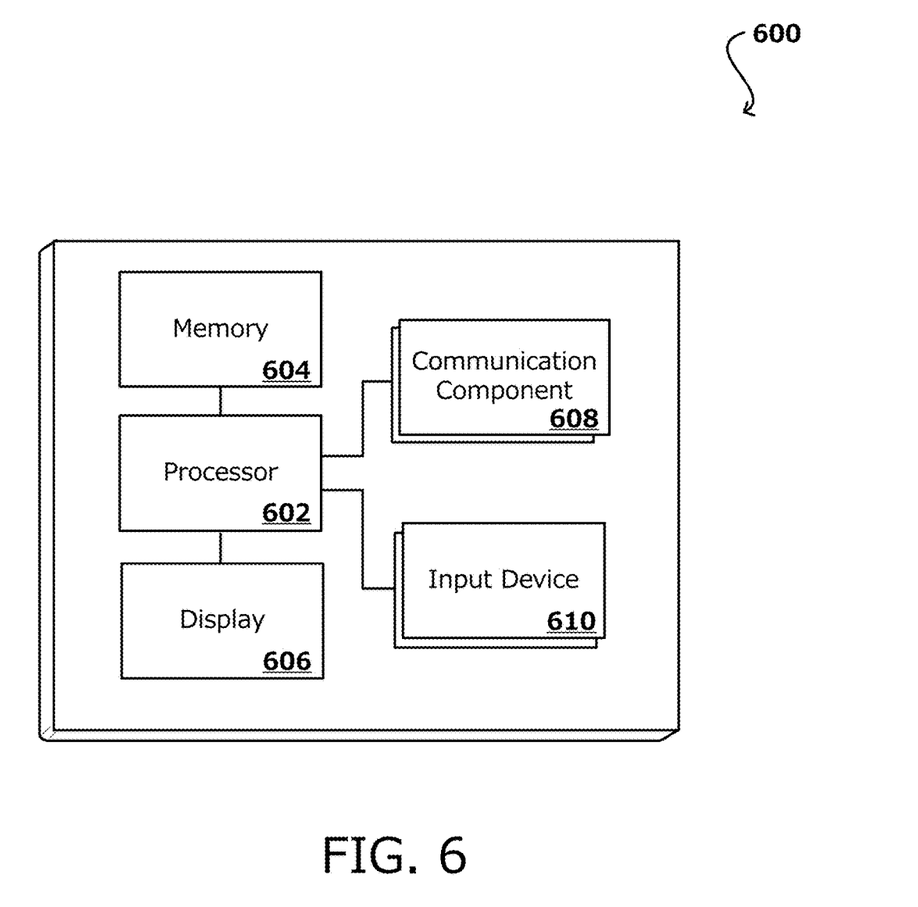
FIG. 6 illustrates a set of basic components of one or more devices of the present disclosure, in accordance with various embodiments of the present disclosure.

FIG. 6 illustrates a set of basic components of one or more devices 600 (e.g., signaling device, control device) of the present disclosure. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device typically will include at least one type of display element 606, such as a touch screen, electronic ink (e-ink), light emitting diodes (LED), organic light emitting diode (OLED), liquid crystal display (LCD), light bulbs, among others. The device can include at least one communication component 608, as may enabled wired and/or wireless communication of voice, sounds, and/or data signals, for example, over a network such as the Internet, a cellular network, a Wi-Fi network, BLUETOOTH®, and the like. The device can include at least one additional input device 610 able to receive conventional input from a user. This conventional input can include, for example, a push button, touch pad, touch screen, wheel, joystick, keyboard, mouse, trackball, camera, switch, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A portable signaling system, comprising:
 a signaling device, comprising:
  at least one indicator light controllable to display a left signal and a right signal;
  a first mounting component for removably mounting the signaling device to a transport object; and
 a control device communicative with the signaling device to control the at least one indicator light, the control device comprising:
  a user interface for receiving a user input, the user interface including a left input component for controlling the at least one indicator light to display the left signal and a right input component for controlling the at least one indicator light to display the right signal; and
  a second mounting component for mounting the control device to a handle of the transport object, wherein the second mounting component positions the control device at an opposite end of the transport object from the signaling device.

2. The signaling system of claim 1, wherein the signaling device further comprises an audio device controllable by the control device to emit a sound.

3. The signaling system of claim 1, wherein the control device is wirelessly communicative with the signaling device.

4. The signaling system of claim 1, wherein at least one of the signaling device or the control device includes a power source, the power source including at least one of a battery or a solar power source.

5. The signaling system of claim 1, wherein the first or second mounting component includes at least one of a strap, a magnetic, or a clip.

6. The signaling system of claim 1, wherein the at least one indicator is controllable to display a straight signal and the user interface includes a straight input for controlling the at least one indicator to display the straight signal.

7. The signaling system of claim 1, wherein the control device includes a mobile phone and the user interface is rendered on a display screen of the mobile phone.

8. The signaling system of claim 1, wherein the left user input comprises a left button and the right user input comprises a right button.

* * * * *